US012691589B2

(12) United States Patent
Wang

(10) Patent No.: US 12,691,589 B2
(45) Date of Patent: Jul. 28, 2026

(54) CONTROL SYSTEM FOR INTELLIGENT BIOMIMETIC EXPRESSION ROBOT BASED ON FACIAL MUSCLE NEURAL NETWORK

(71) Applicant: Quansheng Wang, Shenzhen (CN)

(72) Inventor: Quansheng Wang, Shenzhen (CN)

( * ) Notice: Subject to any disclaimer, the term of this patent is extended or adjusted under 35 U.S.C. 154(b) by 0 days.

(21) Appl. No.: 19/311,245

(22) Filed: Aug. 27, 2025

(65) Prior Publication Data

US 2026/0175436 A1 Jun. 25, 2026

(30) Foreign Application Priority Data

Dec. 24, 2024 (CN) .......................... 202411910132.8

(51) Int. Cl.
*B25J 11/00* (2006.01)
*B25J 9/16* (2006.01)
*B25J 13/08* (2006.01)
(52) U.S. Cl.
CPC ........... *B25J 11/0015* (2013.01); *B25J 9/161* (2013.01); *B25J 11/001* (2013.01); *B25J 13/085* (2013.01)
(58) Field of Classification Search
CPC ...... B25J 11/0015; B25J 9/161; B25J 11/001; B25J 13/085
See application file for complete search history.

(56) References Cited

U.S. PATENT DOCUMENTS 8,594,839 B2 * 11/2013 Hanson .................. G06N 3/008
700/258

FOREIGN PATENT DOCUMENTS

| CN | 106393126 A | 2/2017 |
| CN | 115589845 A | 1/2023 |
| CN | 117011429 A | 11/2023 |
| CN | 17171392 A | 12/2023 |

OTHER PUBLICATIONS

Notification to Grant Patent Right for Invention, Chinese Application No. 202411910132.8, mailed Jan. 28, 2025 (3 pages).

* cited by examiner

*Primary Examiner* — Basil T. Jos
(74) *Attorney, Agent, or Firm* — HOWARD M COHN and Associates, LLC

(57) ABSTRACT

A control system for an intelligent biomimetic expression robot based on a facial muscle neural network, including a support body, a power module, a control module, a muscle neural network, and an expression generation body. Second sensors are connected to the grid conductor. Drive units are distributed and connected at the intersection points within the grid conductor, and the ends of the grid conductor are electrically connected to first output ports. Under the control of control units, the drive units generate driving forces. The first sensor is configured to detect the longitudinal forces generated by the drive units, while the second sensor is configured to detect the horizontal force generated by the drive units. When the first output port applies the power difference through the grid conductor to the drive units, the power difference between adjacent drive units continuously changes, thereby causing the deformation zone to undergo continuous deformation.

8 Claims, 6 Drawing Sheets

140

140

CONTROL SYSTEM FOR INTELLIGENT BIOMIMETIC EXPRESSION ROBOT BASED ON FACIAL MUSCLE NEURAL NETWORK

TECHNICAL FIELD

The present disclosure relates to the technical field of biomimetic expression robots, and more particularly to a control system for an intelligent biomimetic expression robot based on a facial muscle neural network.

BACKGROUND

With the development of technologies, humanoid robot technology is rapidly evolving and has become a new high ground for technological competition. In China, humanoid robots have grown from scratch, with continuous technological achievements, expanding application scenarios, and an accelerating localization process for core components, gradually advancing toward more sophisticated and intelligent directions. However, due to the complex internal structure of humanoid robots, multiple power sources are required to control multiple execution units separately, leading to difficulties in precise control quantification. Additionally, the low consistency in coordinated control among multiple power sources results in poor coordination of local control quantities in bionic robots, making it challenging to achieve natural bionic morphological effects.

The micro-expression generation apparatus and method with Patent Number CN 108710325 B discloses a micro-expression drive module, N magnetic control bodies, and an expression-controlled body, where N is an integer greater than 1. The micro-expression drive module is configured to generate a magnetic field based on received control commands to control the motion trajectory of the magnetic control bodies. The magnetic control bodies are embedded in the expression-controlled body to drive it, thereby forming different micro-expressions. This solution replaces complex mechanical stretching apparatuses with magnetic control bodies, reducing the cost and control complexity of the micro-expression generation apparatus to some extent. The magnetic control bodies are smaller in volume, allowing more to be placed within the same space. However, since the magnetic control bodies are controlled independently of each other, the consistency of coordinated control is poor, resulting in inferior effects in mimicking natural expression changes.

Harbin Institute of Technology proposed a facial expression simulation apparatus based on a hydraulic bionic actuator (Patent Number CN 106393126 B), which includes a simulated muscle assembly, a flow channel control valve assembly, a micropump, and a logic control unit. The simulated muscle assembly is mounted on a simulated human face, connected to the micropump's interface via flow channels. The flow channel control valve assembly is mounted on the flow channels between the simulated muscle assembly and the micropump, and both the power supply controllers of the flow channel control valve assembly and the micropump are connected to the logic control unit. This solution partially addresses issues such as complex mechanical structures, poor stability, high cost, low simulation fidelity, as well as the bulky size of pneumatic actuators, cumbersome control, and unsatisfactory simulation effects.

An inflatable dielectric elastomer hemispherical actuator with Patent Number CN100581039C discloses a first pre-stretched dielectric elastomer film adhered to the inner surface of a first soft sheet and a second pre-stretched dielectric elastomer film adhered to the inner surface of a second soft sheet. The inner vertical surface at the upper end of the first pre-stretched dielectric elastomer film is bonded to the inner vertical surface at the upper end of the second pre-stretched dielectric elastomer film, forming a hemispherical space between the first electrode and the substrate. This solution partially resolves problems such as complex mechanical structures, poor flexibility, and inferior bionic performance in actuators.

However, while the aforementioned existing technologies partially address the complexity of internal structures in bionic robots, they fail to adequately resolve issues of bionic coordination. Moreover, precise quantification of control among individual drive sources remains challenging. Additionally, during facial expression generation, the requirements for local muscle deformation vary, and continuous deformation must be ensured. Therefore, it is necessary to solve the continuity of bionic facial muscle deformation and improve the coordination of local control quantities in bionic robots.

SUMMARY OF THE DISCLOSURE

The objective of the present disclosure is to provide a control system for an intelligent biomimetic expression robot based on a facial muscle neural network, aimed at solving the problems of continuity of biomimetic facial muscle deformation and improving the coordination of local control quantities in biomimetic robots.

To solve the above technical problems, the present disclosure provides a control system for an intelligent biomimetic expression robot based on a facial muscle neural network, including:

a support body;

a power module, arranged with a plurality of first output ports;

a control module, including a plurality of control units and a plurality of first sensors; wherein the control module is electrically connected to the power module;

a muscle neural network, including a grid conductor that includes conductive wires that are interconnected in a grid pattern, a plurality of drive units, and a plurality of second sensors; wherein the grid conductor is connected to the plurality of second sensors; a plurality of intersection points are formed within the grid conductor, and each intersection point is connected to a corresponding drive unit; ends of the grid conductor are electrically connected to the plurality of first output ports; each drive unit is configured to generate a driving force under a control of a corresponding control unit; each first sensor is configured to detect a longitudinal force component of the driving force generated by a corresponding drive unit, and each second sensor is configured to detect a horizontal force component of the driving force generated by a corresponding drive units; and an expression generation body, connected to the support body; wherein the expression generation body includes a plurality of deformation zones, with the plurality of drive units connected to the plurality of deformation zones; the plurality of drive units are configured to generate the driving forces continuously varying to cause the plurality of deformation zones to undergo continuous deformation;

wherein the plurality of first output ports are configured to output a power difference through the grid conductor to act on the plurality of drive units, and the power difference between each adjacent drive units are continuously changeable, causing the plurality of deformation zones to undergo continuous deformation;

wherein the conductive wires include a plurality of horizontal conductive wires and a plurality of longitudinal conductive wires; the plurality of intersection points are located where the plurality of horizontal conductive wires and the plurality of longitudinal conductive wires intersect; the plurality of second sensors are respectively located on the plurality of horizontal conductive wires and the longitudinal conductive wires, and the plurality of drive units are respectively located at the plurality of intersection points; the plurality of horizontal conductive wires and the plurality of longitudinal conductive wires are respectively connected to the plurality of first output ports to obtain continuous voltage signals, forming continuously varying voltage difference signals at each adjacent intersection points, and causing the power difference between each adjacent drive units to continuously vary.

In some embodiments, the plurality of control units are arranged in an array below the plurality of drive units and are electrically connected to the power module; the plurality of control units are fixed to the support body.

In some embodiments, the power module further includes a plurality of second output ports; each second output port is electrically connected to a corresponding control unit, and each first sensor is disposed and abuts against between the support body and a corresponding control unit.

In some embodiments, the muscle neural network further includes a plurality of shape memory alloys, connected around the plurality of intersection points of the plurality of horizontal conductive wires and the plurality of longitudinal conductive wires, causing each drive unit to undergo elastic deformation relative to the plurality of horizontal conductive wires and the plurality of longitudinal conductive wires.

In some embodiments, each drive unit is a first electromagnet, and a corresponding control unit is a second electromagnet.

In some embodiments, in a case where the first electromagnet and the second electromagnet generate a first attractive force, the first electromagnet moves closer to the second electromagnet in a plane; in a case where the first electromagnet and the second electromagnet generate a second attractive force, and the second attractive force is greater than the first attractive force, the first electromagnet moves closer to the second electromagnet in space.

In some embodiments, in a case where the first electromagnet and the second electromagnet generate a first repulsive force, the first electromagnet moves away from the second electromagnet in a plane; in a case where the first electromagnet and the second electromagnet generate a second repulsive force, and the second repulsive force is greater than the first repulsive force, the first electromagnet moves away from the second electromagnet in space.

In some embodiments, each drive unit is a first hydraulic pump, and a corresponding control unit is a second hydraulic pump; or, each drive unit is a first air pump, and a corresponding control unit is a second air pump.

Implementing the embodiments of the present disclosure provides the following beneficial effects.

1. In the control system as proposed, second sensors are connected to the grid conductor, and multiple intersection points are formed within the grid conductor. Drive units are distributed and connected at the intersection points, and the ends of the grid conductor are electrically connected to first output ports. Under the control of control units, the drive units generate driving forces. The first sensor is configured to detect the longitudinal forces generated by the drive units, while the second sensor is configured to detect the horizontal force generated by the drive units. When the first output port applies the power difference through the grid conductor to the drive units, the power difference between adjacent drive units continuously changes, thereby causing the deformation zone to undergo continuous deformation.

2. Since the grid conductor includes multiple horizontal conductive wires, multiple longitudinal conductive wires, and intersection points where the horizontal conductive wires and longitudinal conductive wires intersect, and the second sensors are distributed along the horizontal conductive wires and longitudinal conductive wires, and the drive units are located at the intersection points, the horizontal conductive wires and longitudinal conductive wires are respectively connected to the first output ports to obtain continuous voltage signals, thereby forming continuously varying voltage difference signals at each adjacent intersection points that act on the drive units, causing the power difference between adjacent drive units to continuously vary.

3. Since the muscle neural network further includes multiple shape memory alloys, and the shape memory alloys are connected around the intersection points of the horizontal conductive wires and the longitudinal conductive wires, each drive unit can undergo elastic deformation relative to the horizontal conductive wires and the longitudinal conductive wires, thereby allowing the drive unit to drive the deformation zone to undergo deformation and natural recovery.

4. Since the drive unit is the first electromagnet and the control unit is the second electromagnet, when the first electromagnet and the second electromagnet generate a first attractive force, the first electromagnet moves closer to the second electromagnet in the plane, thereby causing the deformation zone to undergo planar deformation expression; when the first electromagnet and the second electromagnet generate a second attractive force, and the second attractive force is greater than the first attractive force, the first electromagnet moves closer to the second electromagnet in space, causing the deformation zone to produce a three-dimensional concave deformation expression; when the first electromagnet and the second electromagnet generate a first repulsive force, the first electromagnet moves away from the second electromagnet in the plane, causing the deformation zone to produce a planar deformation expression; when the first electromagnet and the second electromagnet generate a second repulsive force, and the second repulsive force is greater than the first repulsive force, the first electromagnet moves away from the second electromagnet in space, causing the deformation zone to exhibit a three-dimensional bulging deformation expression.

BRIEF DESCRIPTION OF THE DRAWINGS

To more clearly illustrate the technical solutions of the embodiments of the present disclosure or the related art, the following is a brief introduction to the drawings used in the description of the embodiments or the related art. It is obvious that the drawings described below are only some embodiments of the present disclosure. For those skilled in the art, other drawings may be obtained based on these drawings without creative labor.

Figure 1:
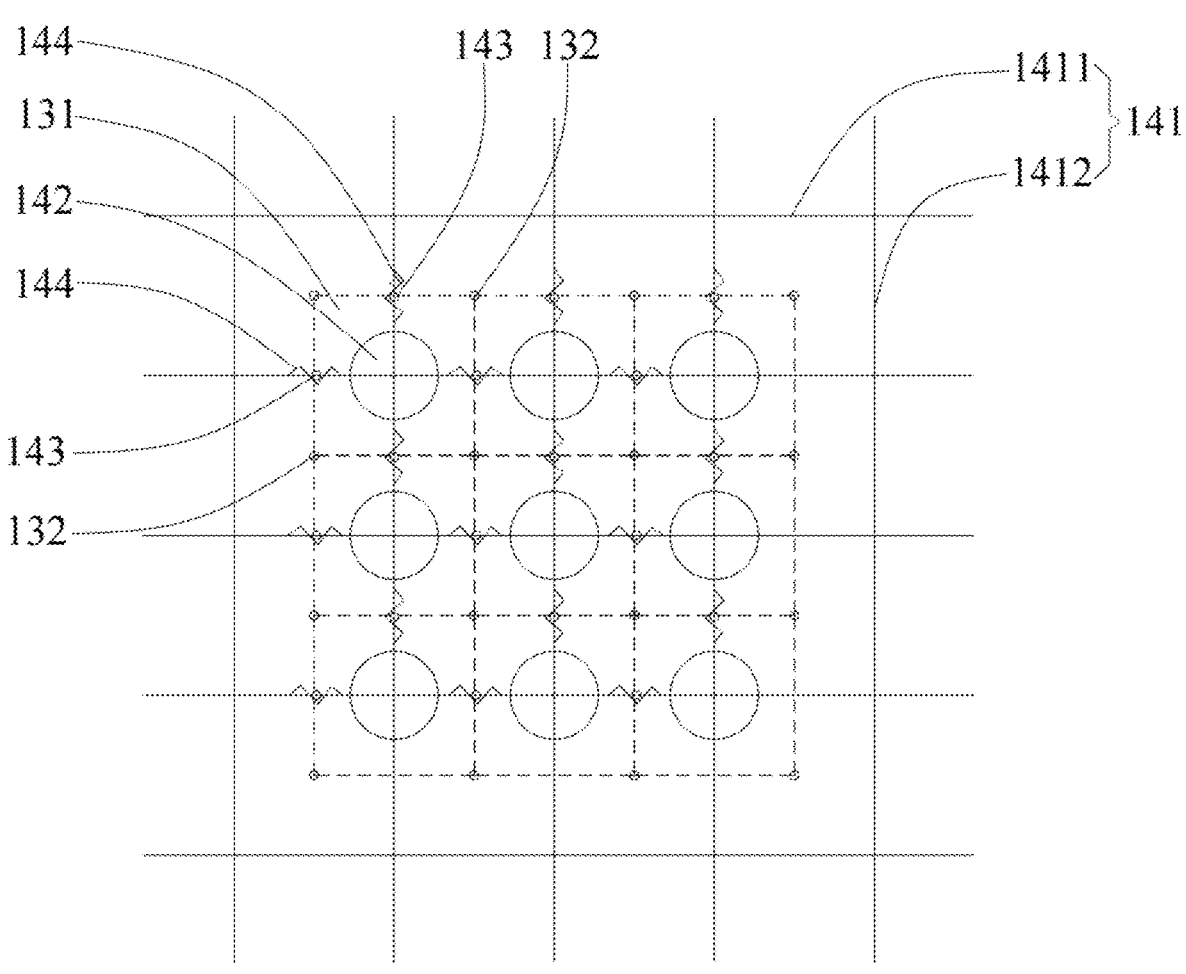
FIG. 1 is a front view of a muscle neural network according to some embodiments of the present disclosure.

Reference numerals: 100, robot control system; 110, support body; 120, power module; 121, first output port; 122, second output port; 130, control module; 131, control unit; 132, first sensor; 140, muscle neural network; 141, grid conductor; 1411, horizontal conductive wire; 1412, longitudinal conductive wire; 142, drive unit; 143, second sensor; 144, shape memory alloy; 150, expression generation body; 151, deformation zone.

DETAILED DESCRIPTION

To facilitate understanding of the present disclosure, the following description will refer to the accompanying drawings for a more comprehensive description of the present disclosure. The drawings illustrate some embodiments of the present disclosure. However, the present disclosure may be embodied in many different forms and is not limited to the embodiments described herein. On the contrary, the purpose of providing these embodiments is to provide a more thorough and comprehensive understanding of the present disclosure.

It should be noted that when an element is referred to as being "fixed to" another element, the element may be directly on the other element, or an intermediate element may exist between the two elements. When an element is considered to be "connected" to another element, the element may be directly connected to the other element, or an intermediate element may exist between the two elements. The terms "vertical," "horizontal," "left," "right," and similar expressions used herein are for illustrative purposes only.

Unless otherwise defined, all technical and scientific terms used herein have the same meanings as those commonly understood by those skilled in the art. The terms used herein in the description of the present disclosure are intended to describe specific embodiments and are not intended to limit the scope of the present disclosure. The term "and/or" includes any and all combinations of one or more of the listed items.

Figure 2:
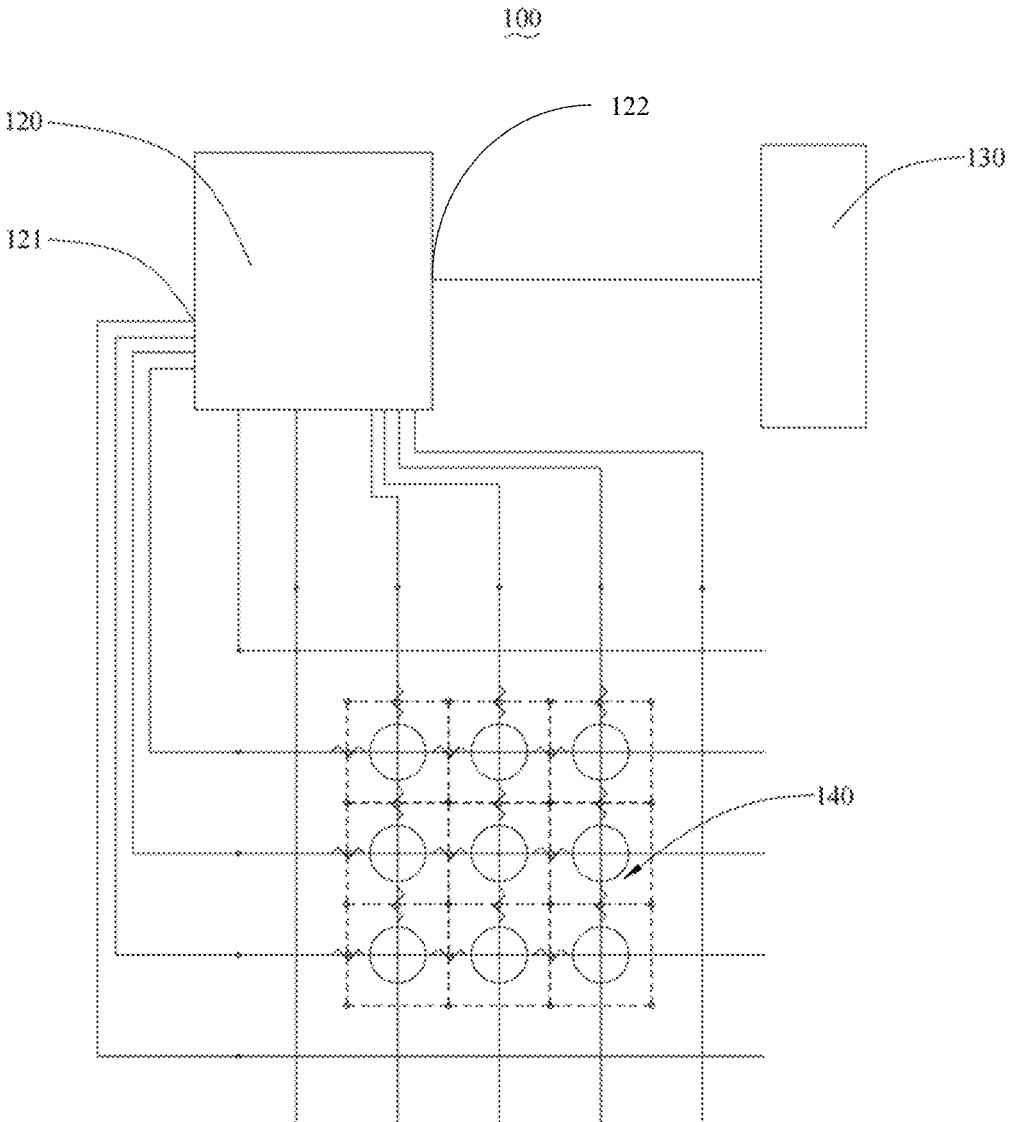
FIG. 2 is a circuit diagram of a control system for an intelligent biomimetic expression robot based on a facial muscle neural network according to some embodiments of the present disclosure.
Figure 3:
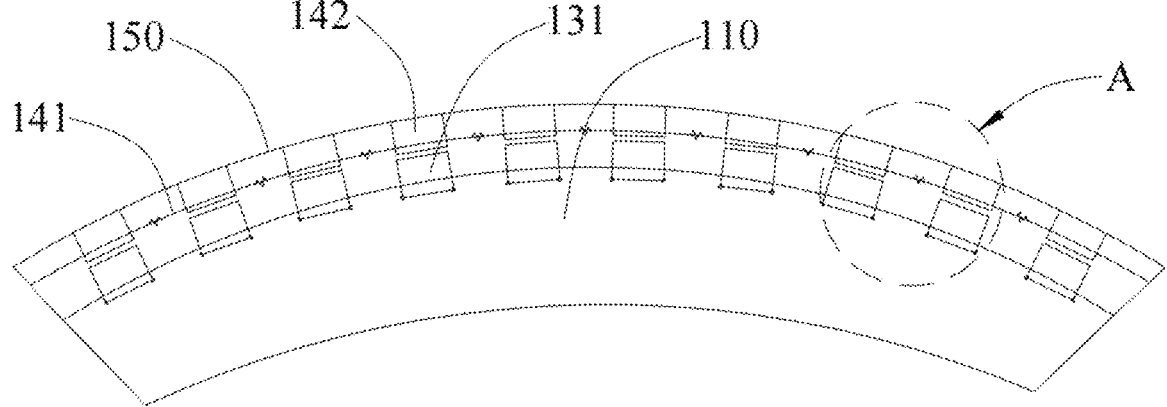
FIG. 3 is a side view of a control system for an intelligent biomimetic expression robot based on a facial muscle neural network according to some embodiments of the present disclosure.
Figure 4:
FIG. 4 is an enlarged view of the portion A circumscribed in FIG. 3.
Figure 4:
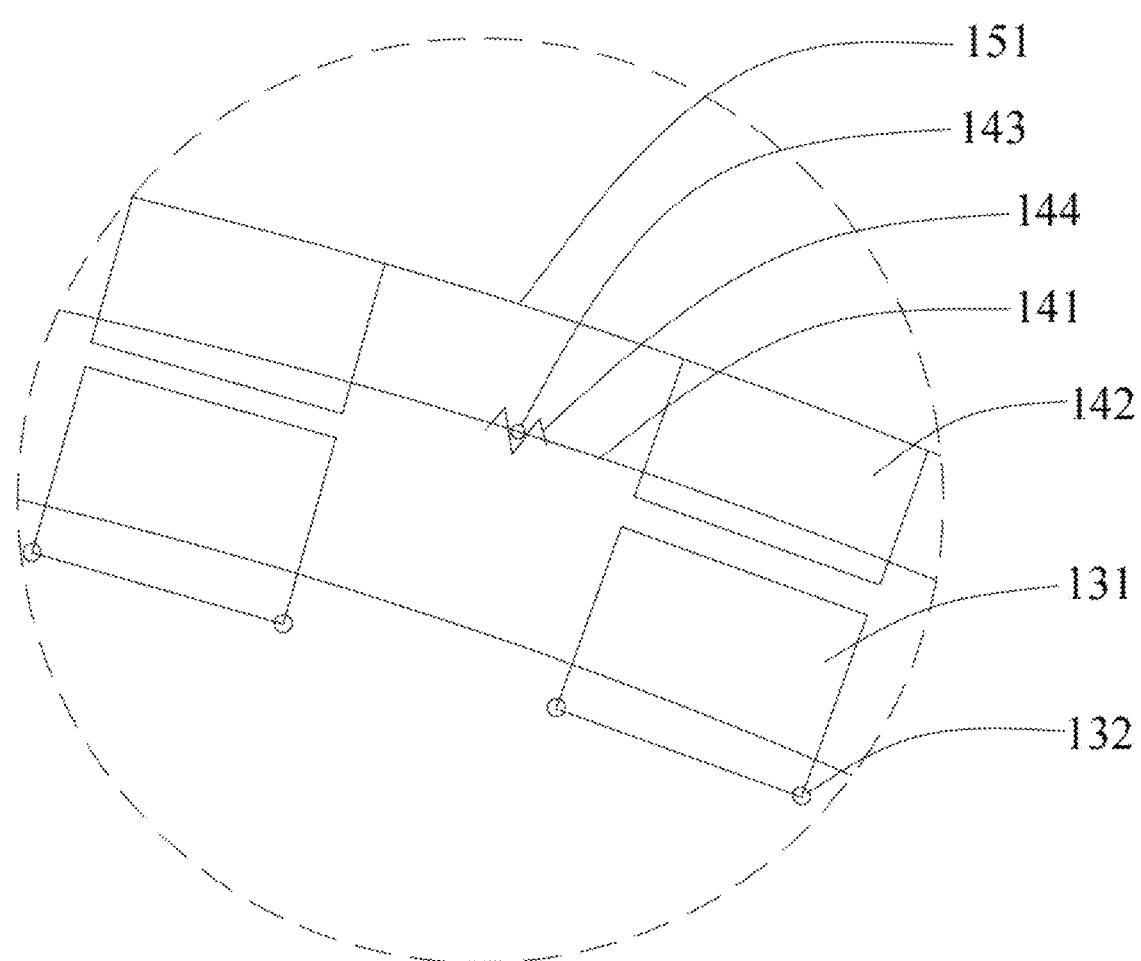
Figure 5:
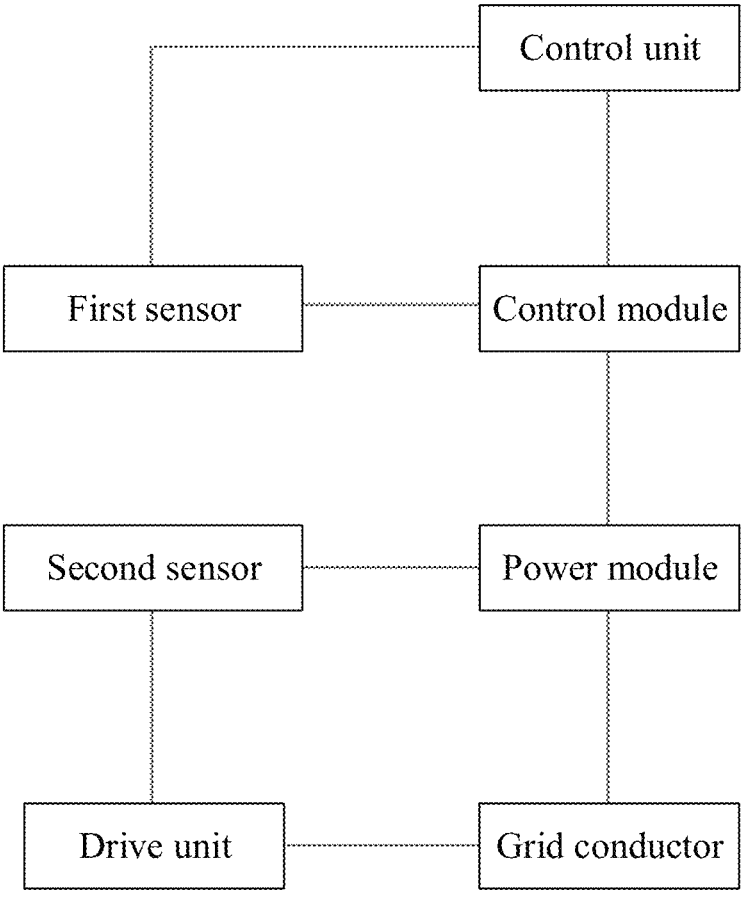
FIG. 5 is a schematic diagram of a control system for an intelligent biomimetic expression robot based on a facial muscle neural network according to some embodiments of the present disclosure.
Figure 6:
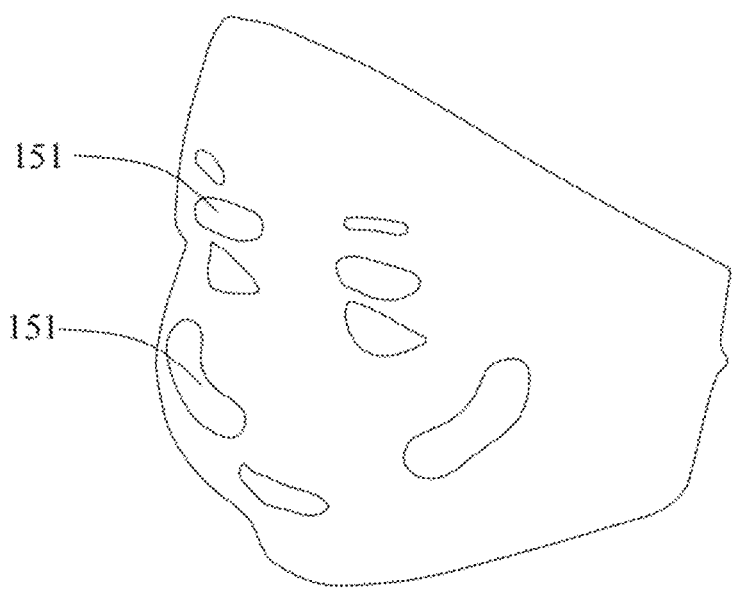
FIG. 6 is a structural schematic diagram of an expression generation body according to some embodiments of the present disclosure.

Referring to FIGS. 1-6, the present disclosure provides a control system 100 for an intelligent biomimetic expression robot based on a facial muscle neural network 140, including a support body 110, a power module 120, a control module 130, a muscle neural network 140, and an expression generation body 150; where the power module 120 is arranged with multiple first output ports 121; the control module 130 includes multiple control units 131 and multiple first sensors 132, and the control module 130 is electrically connected to the power module 120; the muscle neural network 140 includes a grid conductor 141 that includes conductive wires that are interconnected in a grid pattern, multiple drive units 142, and multiple second sensors 143; the grid conductor 141 is connected to the second sensors 143; multiple intersection points are formed within the grid conductor 141, and each intersection point is connected to a corresponding drive unit 142; ends of the grid conductor 141 are electrically connected to the first output ports 121; each drive unit 142 is configured to generate a driving force under the control of a corresponding control unit 131; each first sensor 132 is configured to detect a longitudinal force generated by a corresponding drive unit 142, and each second sensor 143 is configured to detect a horizontal force generated by a corresponding drive units 142; the expression generation body 150 is connected to the support body 110; the expression generation body 150 includes multiple deformation zones 151, with the multiple drive units 142 connected to the deformation zones 151; each drive unit 142 is configured to generate a continuously varying driving force to cause the deformation zones 151 to undergo continuous deformation. In specific applications, the muscle neural network 140 may include at least two grid conductors, each of which may be embedded with a refined grid to refine the expression change patterns. Since the grid conductor 141 is connected to the second sensors 143, the multiple intersection points within the grid conductor 141 are each connected to a corresponding drive unit 142, and the ends of the grid conductor 141 are electrically connected to the first output ports 121, it can be understood that the grid conductor 141 is similar to a grid formed by interwoven wires, with each small grid having four intersection points. Each intersection point branches out to an end, where it is connected to a corresponding first output port 121. The drive unit 142 connected at the intersection point receives signals from the first output port 121, thereby generating varying driving forces under the control of the control unit 131. The first sensor 132 is connected to the control unit 131, which generates a counterforce. The first sensor 132 is configured to detect a longitudinal force generated by the drive unit 142, enabling the power module 120 to feedback and regulate the magnitude of the longitudinal force of the drive unit 142. The second sensor 143 is connected to the grid conductor 141, and the second sensor 143 is configured to detect a horizontal force generated by the drive unit 142, enabling the power module 120 to feedback and regulate the magnitude of the horizontal force of the drive unit 142. Specifically, when the first output port 121 outputs the power difference through the grid conductor 141 to act on each drive unit 142, the power difference between adjacent drive units 142 continuously changes, causing the deformation zone 151 to undergo continuous deformation, thereby addressing the issues of poor continuity and coordination in the deformation of biomimetic facial muscles.

In one implementation, the grid conductor 141 includes multiple horizontal conductive wires 1411, multiple longitudinal conductive wires 1412, and intersection points where the horizontal conductive wires 1411 and the longitudinal conductive wires 1412 intersect. The second sensors 143 are respectively located on the horizontal conductive wires 1411 and the longitudinal conductive wires 1412, and the drive units 142 are respectively located at the intersection points. The horizontal conductive wires 1411 and the longitudinal conductive wires 1412 are respectively connected to the first output ports 121 to obtain continuous voltage signals, forming continuously varying voltage difference signals at each adjacent intersection points, thereby causing the power difference between adjacent drive units 142 to continuously vary. In practical applications, since the grid conductor 141 includes multiple horizontal conductive wires 1411, multiple longitudinal conductive wires 1412, and intersection points where the horizontal conductive wires 1411 and longitudinal conductive wires 1412 intersect, and the second sensors 143 are distributed along the horizontal conductive wires 1411 and longitudinal conductive wires 1412, and the drive units 142 are located at the intersection points, the horizontal conductive wires 1411 and longitudinal conductive wires 1412 are respectively connected to the first output ports 121 to obtain continuous voltage signals, thereby forming continuously varying voltage difference signals at each adjacent intersection points that act on the drive units 142, causing the power difference between adjacent drive units 142 to continuously vary. In this way, there is no need to connect wires specifically to the drive units 142, avoiding the complexity of internal wiring and potential signal interference. It is worth noting that, for example, the input ends of adjacent drive units 142 on a same horizontal conductive wire 1411 are connected to the same horizontal conductive wire 1411, but the output ends of the of adjacent drive units 142 are connected to different longitudinal conductive wires 1412. In this way, continuously varying the signal on the adjacent longitudinal conductive wires 1412 will cause the adjacent drive units 142 on the horizontal conductive wire 1411 to generate continuous power output values. Similarly, the output ends of the adjacent drive units 142 on a same longitudinal conductive wire 1412 are connected to the same longitudinal conductive wires 1412, but the input ends of the of adjacent drive units 142 are connected to different horizontal conductive wires 1411. In this way, continuously varying the signal on the adjacent horizontal conductive wires 1411 will cause the adjacent drive units 142 on the longitudinal conductive wire 1412 to generate continuous power output values, thereby enabling the adjacent drive units 142 to act on the deformation zone 151 to produce continuous and coordinated deformation.

In one implementation, the control units 131 are arranged in an array below the drive units 142 and are electrically connected to the power module 120. The control units 131 are fixed to the support body 110. In practical applications, since the multiple control units 131 are arranged in an array below the drive units 142 and are electrically connected to the power module 120, when the drive unit 142 moves one grid distance, the control unit 131 corresponding to that grid continuously applies a force to the drive unit 142, enabling the drive unit 142 to move multiple grids. This causes the drive unit 142 to drive the deformation zone 151 to undergo greater deformation, thereby causing the expression generation body 150 to produce exaggerated expression changes. Additionally, it is worth noting that the characteristic of the multiple control units 131 is that each control unit 131 can be controlled independently. For example, under the action of the control unit 131 in a first grid, the drive unit 142 can generate a first driving force, and under the action of the control unit 131 in a second grid, the drive unit 142 can generate a second driving force different from the first driving force, thereby applying different deformation forces to the deformation zone 151, enabling the expression generation body 150 to achieve a more refined and realistic expression generation effect.

In one implementation, the power module 120 further includes multiple second output ports 122, with each second output port 122 electrically connected to a corresponding control unit 131, and each first sensor 132 is disposed and abuts against between the support body 110 and a corresponding control unit 131. In specific applications, since the second output ports 122 are electrically connected to the control units 131, and the first sensors 132 are positioned between the support body 110 and the control units 131, the command signals of the second output ports 122 can be adjusted according to command signals from the power module 120 to the first output ports 121, and the first sensor 132 collects longitudinal feedback signals generated by the control units 131 and transmits them to the power module 120, thus enabling the power module 120 to dynamically balance and adjust the command signals of the second output ports 122.

In one implementation, the muscle neural network 140 further includes multiple shape memory alloys 144, connected around the intersection points of the horizontal conductive wires 1411 and the longitudinal conductive wires 1412, such that each drive unit 142 can undergo elastic deformation relative to the horizontal conductive wires 1411 and the longitudinal conductive wires 1412. In specific applications, the shape memory alloys 144 are connected around the intersection points of the horizontal conductive wires 1411 and the longitudinal conductive wires 1412. It can be understood that there are four vertices in a small grid of the grid conductor 141, each vertex being an intersection point, and each intersection point has four edges, with shape memory alloys 144 connected to each edge. Thus, the drive unit 142 located at the intersection point can move in any direction, enabling all drive units 142 to cause elastic deformation of the memory alloy 144 relative to the horizontal conductive wires 1411 and longitudinal conductive wires 1412, thereby allowing the drive unit 142 to drive the deformation zone 151 to undergo deformation and natural recovery.

In one implementation, the drive unit 142 is a first electromagnet, and the control unit 131 is a second electromagnet; when the first electromagnet and the second electromagnet generate a first attractive force, the first electromagnet moves closer to the second electromagnet in the plane; when the first electromagnet and the second electromagnet generate a second attractive force, and the second attractive force is greater than the first attractive force, the first electromagnet moves closer to the second electromagnet in space; when the first electromagnet and the second electromagnet generate a first repulsive force, the first electromagnet moves away from the second electromagnet in the plane; when the first electromagnet and the second electromagnet generate a second repulsive force, and the second repulsive force is greater than the first repulsive force, the first electromagnet moves away from the second electromagnet in space. In practical applications, when the first electromagnet and the second electromagnet generate the first attractive force, the first electromagnet moves closer to the second electromagnet in the plane. It is worth noting that in this case, the first attractive force can serve as the load for the deformation of the expression generation body 150 and the horizontal deformation of the shape memory alloy 144, thereby causing the deformation zone 151 to undergo planar deformation expression. When the first electromagnet and the second electromagnet generate the second attractive force, and the second attractive force is greater than the first attractive force, the first electromagnet moves closer to the second electromagnet in space. It is worth noting that in this case, the second attractive force can serve as the load for the deformation of the expression generation body 150 and the horizontal and longitudinal deformation of the shape memory alloy 144, thereby causing the deformation zone 151 to undergo three-dimensional concave deformation, and the expression generation body 150 can simulate the three-dimensional concave effect of the deformation zone 151.

When the first electromagnet and the second electromagnet generate the first repulsive force, the first electromagnet gradually moves away from the second electromagnet in the plane. It is worth noting that in this case, the first repulsive force can serve as the load for the deformation of the expression generation body 150 and the horizontal deformation of the shape memory alloy 144, thereby causing the deformation zone 151 to produce a planar deformation expression. When the first electromagnet and the second electromagnet generate the second repulsive force, and the second repulsive force is greater than the first repulsive force, the first electromagnet gradually moves away from the second electromagnet in space. It is worth noting that in this case, the second repulsive force can serve as the load for the deformation of the expression generation body 150 and the horizontal and longitudinal deformation of the shape memory alloy 144, thereby causing the deformation zone 151 to undergo three-dimensional bulging deformation, and the expression generation body 150 can simulate the three-dimensional bulging effect of the deformation zone 151.

In one implementation, the drive unit 142 is a first hydraulic pump, and the control unit 131 is a second hydraulic pump; or, the drive unit 142 is a first air pump, and the control unit 131 is a second air pump. In specific applications, when the drive unit 142 is a first hydraulic pump and the control unit 131 is a second hydraulic pump, the first output port 121 controls the power of the first hydraulic pump, and the first hydraulic pump generates driving force acting on the deformation zone 151 to produce horizontal deformation; the second output port 122 controls the power of the second hydraulic pump, and the second hydraulic pump generates driving force acting on the deformation zone 151 to produce longitudinal deformation, thereby enabling the expression generation body 150 to generate expressions driven by hydraulic force. Similarly, when the drive unit 142 is the first air pump and the control unit 131 is the second air pump, the first output port 121 controls the power of the first air pump, and the first air pump generates driving force acting on the deformation zone 151 to produce horizontal deformation; the second outlet 122 controls the power of the second air pump, and the second air pump generates driving force acting on deformation zone 151 to produce longitudinal deformation, thereby causing the expression generation body 150 to generate expressions driven by air pressure.

The above-described embodiments merely illustrate several implementation methods of the present disclosure, which are described in detail and with specificity. However, this should not be construed as limiting the scope of the patent claims. It should be noted that, for those skilled in the art, various modifications and improvements may be made without departing from the scope of the present disclosure. These modifications and improvements are all within the scope of the present disclosure. Therefore, the scope of protection of the present disclosure should be determined by the appended claims.

The invention claimed is:

1. A control system for an intelligent biomimetic expression robot based on a facial muscle neural network, comprising:
   a support body;
   a power module, arranged with a plurality of first output ports;
   a control module, comprising a plurality of control units and a plurality of first sensors; wherein the control module is electrically connected to the power module;

a muscle neural network, comprising a grid conductor that comprises conductive wires that are interconnected in a grid pattern, a plurality of drive units, and a plurality of second sensors; wherein the grid conductor is connected to the plurality of second sensors; a plurality of intersection points are formed within the grid conductor, and each intersection point is connected to a corresponding drive unit; ends of the grid conductor are electrically connected to the plurality of first output ports; each drive unit is configured to generate a driving force under a control of a corresponding control unit; each first sensor is configured to detect a longitudinal force component of the driving force generated by a corresponding drive unit, and each second sensor is configured to detect a horizontal force component of the driving force generated by a corresponding drive units; and an expression generation body, connected to the support body; wherein the expression generation body comprises a plurality of deformation zones, with the plurality of drive units connected to the plurality of deformation zones; the plurality of drive units are configured to generate the driving forces continuously varying to cause the plurality of deformation zones to undergo continuous deformation;

wherein the plurality of first output ports are configured to output a power difference through the grid conductor to act on the plurality of drive units, and the power difference between each adjacent drive units are continuously changeable, causing the plurality of deformation zones to undergo continuous deformation;

wherein the conductive wires comprise a plurality of horizontal conductive wires and a plurality of longitudinal conductive wires; the plurality of intersection points are located where the plurality of horizontal conductive wires and the plurality of longitudinal conductive wires intersect; the plurality of second sensors are respectively located on the plurality of horizontal conductive wires and the longitudinal conductive wires, and the plurality of drive units are respectively located at the plurality of intersection points; the plurality of horizontal conductive wires and the plurality of longitudinal conductive wires are respectively connected to the plurality of first output ports to obtain continuous voltage signals, forming continuously varying voltage difference signals at each adjacent intersection points, and causing the power difference between each adjacent drive units to continuously vary.

2. The control system according to claim 1, wherein the plurality of control units are arranged in an array below the plurality of drive units and are electrically connected to the power module; the plurality of control units are fixed to the support body.

3. The control system according to claim 2, wherein the power module further comprises a plurality of second output ports; each second output port is electrically connected to a corresponding control unit, and each first sensor is disposed and abuts against between the support body and a corresponding control unit.

4. The control system according to claim 1, wherein the muscle neural network further comprises a plurality of shape memory alloys, connected around the plurality of intersection points of the plurality of horizontal conductive wires and the plurality of longitudinal conductive wires, causing each drive unit to undergo elastic deformation relative to the plurality of horizontal conductive wires and the plurality of longitudinal conductive wires.

5. The control system according to claim 4, wherein each drive unit is a first electromagnet, and a corresponding control unit is a second electromagnet.

6. The control system according to claim 5, wherein in a case where the first electromagnet and the second electromagnet generate a first attractive force, the first electromagnet moves closer to the second electromagnet in a plane; in a case where the first electromagnet and the second electromagnet generate a second attractive force, and the second attractive force is greater than the first attractive force, the first electromagnet moves closer to the second electromagnet in space.

7. The control system according to claim 5, wherein in a case where the first electromagnet and the second electromagnet generate a first repulsive force, the first electromagnet moves away from the second electromagnet in a plane; in a case where the first electromagnet and the second electromagnet generate a second repulsive force, and the second repulsive force is greater than the first repulsive force, the first electromagnet moves away from the second electromagnet in space.

8. The control system according to claim 1, wherein each drive unit is a first hydraulic pump, and a corresponding control unit is a second hydraulic pump; or, each drive unit is a first air pump, and a corresponding control unit is a second air pump.

* * * * *